United States Patent
Liao

(10) Patent No.: US 9,436,858 B2
(45) Date of Patent: Sep. 6, 2016

(54) SIMPLE AND PRECISE RADIO FREQUENCY LOCATING SYSTEM AND METHOD

(71) Applicant: Westvalley Digital Technologies, Inc., Chengdu, Sichuan (CN)

(72) Inventor: Jason Y. Liao, Sichuan (CN)

(73) Assignee: WESTVALLEY DIGITAL TECHNOLOGIES, INC., Chengdu, Sichuan (CN)

( * ) Notice: Subject to any disclaimer, the term of this patent is extended or adjusted under 35 U.S.C. 154(b) by 310 days.

(21) Appl. No.: 14/152,466

(22) Filed: Jan. 10, 2014

(65) Prior Publication Data

US 2014/0125461 A1    May 8, 2014

Related U.S. Application Data

(63) Continuation of application No. PCT/CN2011/084355, filed on Dec. 21, 2011.

(30) Foreign Application Priority Data

Jul. 11, 2011   (CN) .......................... 2011 1 0192032

(51) Int. Cl.
*G06K 7/10*    (2006.01)
*G01S 5/02*    (2010.01)
*G01S 13/87*   (2006.01)

(52) U.S. Cl.
CPC ............ *G06K 7/10366* (2013.01); *G01S 5/02* (2013.01); *G01S 5/0284* (2013.01); *G01S 5/0289* (2013.01); *G01S 13/878* (2013.01); *G01S 13/87* (2013.01); *G06K 7/10118* (2013.01)

(58) Field of Classification Search
CPC ...... G01S 5/02; G01S 5/0284; G01S 5/0289; G01S 13/87; G01S 13/878; G06K 7/10366; G06K 7/10118
See application file for complete search history.

(56) References Cited

U.S. PATENT DOCUMENTS

| 8,952,788 B1* | 2/2015 | Dacus ................ G06K 7/10039 340/10.1 |
| 2009/0070797 A1 | 3/2009 | Ramaswamy et al. |
| 2009/0102661 A1* | 4/2009 | Barnes ................... G01V 15/00 340/572.1 |
| 2011/0260923 A1* | 10/2011 | Liao ........................ G01S 11/06 342/458 |

FOREIGN PATENT DOCUMENTS

| CN | 101770009 A | 7/2010 |
| CN | WO 2010078844 A1 * | 7/2010 .............. G01S 11/06 |
| CN | 102081743 A | 6/2011 |

OTHER PUBLICATIONS

State Intellectual Property Office of the P. R. China (ISA/CN), "International Search Report", China, published on Jan. 17, 2013.

* cited by examiner

*Primary Examiner* — Nabil Syed

(74) *Attorney, Agent, or Firm* — Locke Lord LLP; Tim Tingkang Xia, Esq.

(57) ABSTRACT

Disclosed are a radio frequency locating system and method, which efficiently solve the problem of precise locating a moving target tag in a complex environment by using a method where location information is provided for a mobile tag by using low-cost fixed active RFID tags in place of a plurality of readers requiring network connection, and the location information of the mobile tag is directly transferred to a reader at the center of a locating area from a long distance by using a mobile or fixed location tag. The present invention uses a long-distance coordinator and clock information in a transmission instruction to coordinate and schedule communication time between the mobile tag and the location tag, thereby ensuring a super long battery life of the mobile tag and the location tag.

16 Claims, 5 Drawing Sheets

SIMPLE AND PRECISE RADIO FREQUENCY LOCATING SYSTEM AND METHOD

CROSS-REFERENCE TO RELATED APPLICATIONS

This application is a continuation of International Patent Application No. PCT/CN2011/084355, with an international filing date of Dec. 21, 2011, designating the United States, now pending, which is based on Chinese Patent Application No. 201110192032.2, filed Jul. 11, 2011. The contents of these specifications are incorporated herein by reference.

TECHNICAL FIELD

The present invention relates to the precise positioning technologies of an active radio frequency identification (RFID) tag.

BACKGROUND

Besides a "fingerprint locating" technology, which is complex and has poor practicability, a premise of a general existing radio frequency locating technology is that no blocking exists between a radio frequency signal source (an electronic tag) and a radio signal receiver (a reader-writer). In a complex environmental condition, however, various obstacles often exist. Therefore, a large quantity of reader-writers connected to a management computer over a network need to be installed to achieve more precise locating. A complex environment is divided into a plurality of small locating spaces without blocking relatively, or a plurality of locating rings of different sizes, centered around a reader, are arranged (in a Cell-ID locating manner). Considering factors such as the cost, this solution becomes impractical and has low system reliability. Therefore, how to achieve precise locating on a goods and materials device, a person, and the like in a complex environment such as a warehouse, a workshop, an exhibition, and the like site with low a cost becomes a big complication for the radio frequency locating technology.

SUMMARY

The present invention provides a method where the technology of interactive RFID (i-RFID) is used, and simple and fixed active RFID tags having fixed locations to replace a plurality of readers requiring network connection, thereby simply and effectively solving the problem of precise locating a moving target tag in a complex environment.

According to the present invention, one or a plurality of mobile tags exchange information with one or a plurality of location tags with fixed locations to generate information comprising information for determining a location of the mobile tag. Then, information about the location tag or the mobile tag is directly transmitted to a reader located in a center of a locating area in a long-distance transmission manner, then to a management computer, thereby achieving the locating of the mobile tag. The present invention does not employ the following traditional locating manner: a mobile tag transmits an ID to one or a plurality of adjacent readers, the ID is transmitted to a management computer over a network to which various readers are connected, and then location information of the mobile tag is obtained after the computer calculates and processes the related information. The present invention achieves precise locating on a mobile target in a simple, effective, and cost-effective way.

The present invention further uses a coordinator that uninterruptedly transmits an instruction signal to a location tag and a mobile tag in a periodical sleeping state within a short period of time, captures an instant when the location tag and the mobile tag monitor the signal, establishes transient communication with the location tag and the mobile tag and delivers a working instruction to the location tag and the mobile tag. Using the working instruction to control a working manner of the location tag and the mobile tag comprises: arranging a working frequency over which the location tag and the mobile tag mutually communicate with each other, setting transmit power and communication time, and the like. Therefore, a working duty ratio of the mobile tag and the location tag during a locating process is greatly decreased, battery life of the mobile tag and the location tag is prolonged, and locating precision is improved. In addition, because a location reader network is not required, the cost of the system is greatly reduced and working reliability of the system is improved.

The location tag and the mobile tag herein are common active RFID tags that are battery-powered, and employ a working manner of monitoring an instant after periodically waking up.

System Structure

The system according to the present invention comprises a coordinator, a reader, a mobile tag, a location tag, and a management computer. The coordinator and the reader are fixedly installed in the center of each locating area, where communication with all tags can be implemented. Generally, the coordinator and the reader are powered by an external power source, and are connected to the management computer in a wired or wireless manner. The coordinator may also work independently of the computer according to a pre-installed program.

Each location tag or mobile tag has a unique ID, and may be pre-installed with a corresponding program according to actual requirements on applications. The location tags are dispersedly installed in different fixed location in the entire locating area. When necessary, the location tags may further carry information of location coordinates thereof. The mobile tags are installed on a moving target needs to be located, or carried by the moving target.

System Working Mode

Usually, the mobile tag and the location tag are in a periodical sleeping mode, and intermittently monitor, over a coordination channel (the F1 channel), a working instruction signal from a coordinator for an instant sufficient to capture bits for performing DNA check, which is a low-power-consumption state. A plurality of monitoring manners are provided, including: each time after waking up, the location tag and the mobile tag first monitor one or a plurality of bits time that is long enough to determine whether the received radio frequency signal complies with an expected radio frequency feature of the instruction signal transmitted by the coordinator (DNA check); only after the DNA check is passed, the location tag and the mobile tag may extend the instant to receive the entire instruction signal packet (i-RFID), and perform monitoring for a long enough period of time each time after waking up to ensure the working manner of receiving a complete instruction signal packet from the coordinator, and the like.

A wakeup period the location tag and the mobile tag may be determined based on an actual requirement. Generally, the wakeup period is 1 s. When the mobile tag is required to be located, the coordinator uninterruptedly transmits a working instruction signal, over the F1 channel, to the mobile tag and the location tag within a short period of time (generally, this period of time is longer than the wakeup period of the tags) in a broadcast manner, and delivers a specific working instruction to the mobile tag and the location tag.

Upon receiving the instruction information from the coordinator, the location tag and the mobile tag establish a transient communication with each other over an F2 channel according to a working manner required by the instruction from the coordinator. That is, the location tag or the mobile tag transmits information including an own ID to an adjacent mobile tag or location tag according to an instruction requirement, so as to generate information, including the information used for locating the mobile tag. Then, the location tag or the mobile tag directly transmits the information related to a mobile tag location to a reader over an F3 channel in a wireless and long-distance manner. For simplicity, a tag that transmits a signal to another tag, irrespective of the location tag or the mobile tag, is called a transmitter tag, and a tag that receives a signal is called a receiver tag hereafter.

Herein a communication distance between either of the location tag or the mobile and the reader is generally much longer than a communication distance between the location tag and the mobile tag determined by system locating precision. Generally, the communication distance between either of the location tag or the mobile and the reader is from tens of meters to hundreds of meters, or even longer than a kilometer; whereas the communication distance between the location tag and the mobile tag determined by system locating precision is only a plurality of meters, or 10 or 20 meters.

If a manner of transmitting information from the location tag to the mobile tag is employed, after receiving the information from the location tag, the mobile tag transmits the received information and its ID or location information of the mobile tag obtained through calculation of the received information and its ID to the management computer through the reader in the following two manners:

A. When the mobile tag needs to be located in real time, the mobile tag immediately transmits its ID and related information to the reader in a long distance over the F3 channel by using a higher transmit power after receiving the information sent by the location tag. If the number of involved mobile tags is relative large, a corresponding signal anti-collision processing measure needs to be employed during communication between the mobile tag and the reader.

B. If the system needs to only trace the a previous location of the mobile tag and other possible related information, the mobile tag does not need to immediately transmit information to the reader, but records this information first, or records this information in its memory after simple processing, and the mobile tag transmits the recorded information to the management computer through the reader only when receiving an instruction for reading the information (for example, a bus goes back to a terminal station) from the management computer. At this time, the mobile tag comprises an internal clock that records locations of the mobile tag at different time points.

Besides respective ID, the information exchanged between the location tag and the mobile tag may further comprise a transmit power level at which the ID is transmitted, signal intensity (RSSI) when receiving the ID, coordinates of the location tag, and the like. The information is used to further improve precision for locating the mobile tag. In addition, in various application scenarios, the information exchanged between the location tag and the mobile tag may further comprise other information, including sensor information.

A beneficial effect of the present invention is apparent: A structure is simple, the cost is low, and a complex network and the corresponding external power source are not required. By using only a double-A lithium battery, a location tag may be continuously used for 5 to 10 years without replacing the battery. Therefore, installation, use, and maintenance are convenient. Moreover, the locating precision and reliability of the system are extremely improved.

DETAILED DESCRIPTION

The present invention is further described with reference to the accompanying drawings and exemplary embodiments.

Division of a Locating Area Using a Location Tag

Before the locating, the location tags are dispersedly installed in different fixed locations in the entire locating area. First, it should be noted that, because a difference between methods used to determining a specific location of a mobile tag, the corresponding installation and arrangement manners of the location tag and power settings for the location tag or the mobile tag to transmit a signal are also different.

When a simple Cell-ID method is used for locating, that the mobile tag needs to communicate with a certain quantity of location tags is not required during the locating time. Herein the defined Cell-ID locating manner is as follows: if at a location, the mobile tag may communicate only with a certain, or two certain, or three certain (in a two-dimensional space), or four certain (in a three-dimensional space) location tags, a geometrical center of these one, two, three, or four location tags is the location of the mobile tag; if at a location, the mobile tag may communicate with a plurality of location tags during the locating time, the geometrical center of two (in a one-dimensional space), three (in the two-dimensional space), or four (in the three-dimensional space) location tags with a most robust RSSI signal is the location of the mobile tag. According to another common locating method, however, in any circumstance, the mobile tag is required to communicate with at least two (in the one-dimensional space), three (in the two-dimensional space), or four (in the three-dimensional space) location tags.

Figure 3:
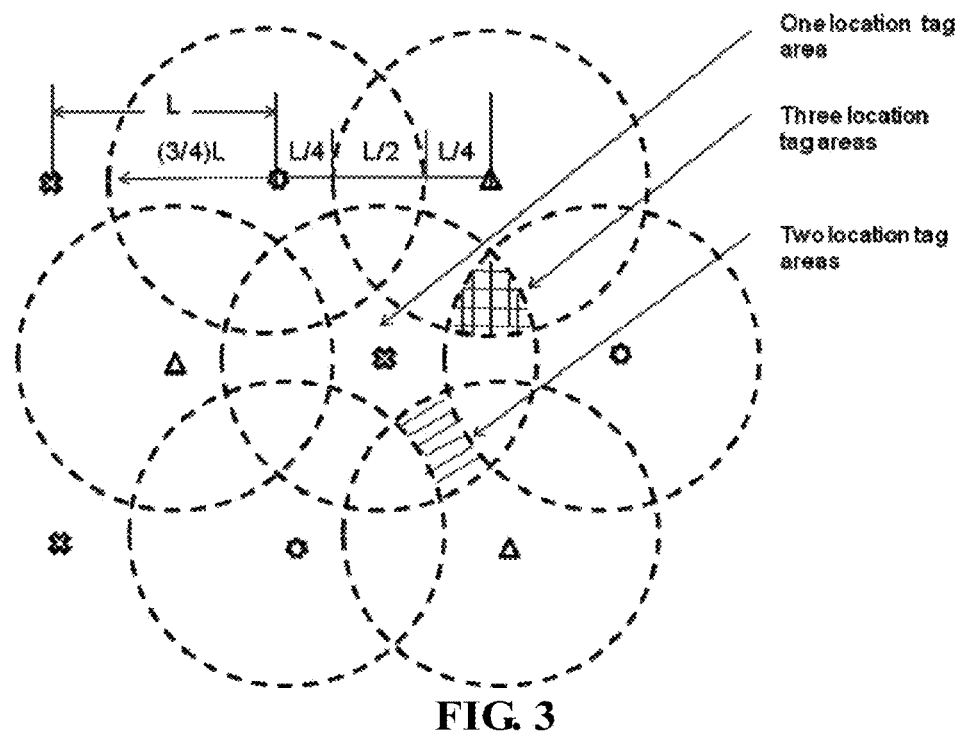
FIG. 3 illustrates Cell-ID-based location and location precision.

A communication range (abbreviated as a locating ring) between each location tag and a mobile tag is determined by the transmit power of a transmitter tag after receiver sensitivity of a receiver tag is determined. Therefore, a size range may be adjusted by changing the transmit power of the transmitter tag. After a separation distance of each location tag is determined, the higher the transmit power of the transmitter tag, the more the location tags that may communicate with the mobile tag, thereby receiving information from a peer end. This means that the amount of information processing is larger and signal collision is more likely to occur. Apparently, for a purpose of reducing useless information generated during the exchange of information between the location tag and the mobile tag, the communication range between the location tag and the mobile tag needs to be controlled. When the foregoing Cell-ID locating manner is employed, locating precision is accurate to ¼ of the separation distance between the location tags if a radio of the separation distance between the location tags and a signal coverage radius of the location tag is arranged to 4:3. Certainly, because a propagation feature of a radio frequency signal, a radius of the locating ring cannot be controlled extremely accurate. Therefore, this ratio is just an ideal value. Apparently, the shorter the separation distance between the location tags, the higher the locating precision. This, however, also requires more location tags, as illustrated in FIG. 3.

Figure 4:
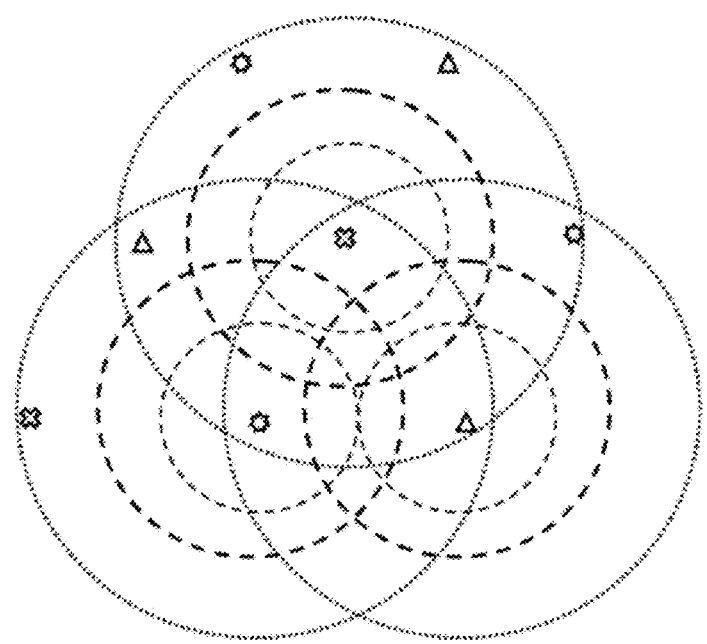
FIG. 4 illustrates a relationship between signal coverage and tag transmit power.

When another locating method is employed, the communication distance between the mobile tag and the location tag needs to be longer than the separation distance between two adjacent location tags, as illustrated in FIG. 4.

The present invention mainly describes the working manner of the system according to the foregoing-defined Cell-ID locating method.

As previously mentioned, arrangement of the separation distance between the location tags depends on an overall consistent locating precision requirement raised by the system for a mobile target or different locating precision requirements of different locating areas. When a locating manner in which the location tag transmits a signal to the mobile tag is employed, compliant with the overall consistent locating precision requirement, all location tags in the entire locating area need to use the same transmit power to transmit the signal; whereas when different locating areas have different locating precision requirements, the location tags located in different locating areas use different transmit powers to transmit the signal. The transmit power used by each location tag related to the same mobile tag, however, must be the same.

When a locating manner in which the mobile tag transmits a signal to the location tag is employed, compliant with the overall consistent locating precision requirement, the transmit power of all the mobile tags only needs to be set to the same value; whereas when different locating areas have different locating precision requirements, a condition is different. The location of the mobile tag may not be predetermined. Therefore, the mobile tag may not be required to transmit the signal by using different transmit powers. In this case, different processing methods are used, for example, all the mobile tags are required to uniformly transmit the signal by using a higher power, or uniformly transmit the signal by using a plurality of powers in an ascending order in sequence.

Irrespective of which locating method is employed, such as the method in which the location tag transmits the signal to the mobile tag or the method in which the mobile tag transmits the signal to the location tag, when different locating areas have different locating precision requirements, a contradiction due to a larger separation distance arranged between a plurality of adjacent location tags is caused. At this time, all the tags that transmit the signal are required to uniformly employ a method according to which the tags transmit the signal by using powers from low to high in sequence.

In addition, due to a cause such as changes of an environmental noise platform, the size of a locating ring determined by a specific transmit power varies with time. Therefore, when the locating ring changes, a coordinator needs to transmit an instruction to properly adjust the transmit power of the transmitter tag.

Communication Manner Between the Location Tag and the Mobile Tag

Figure 1:
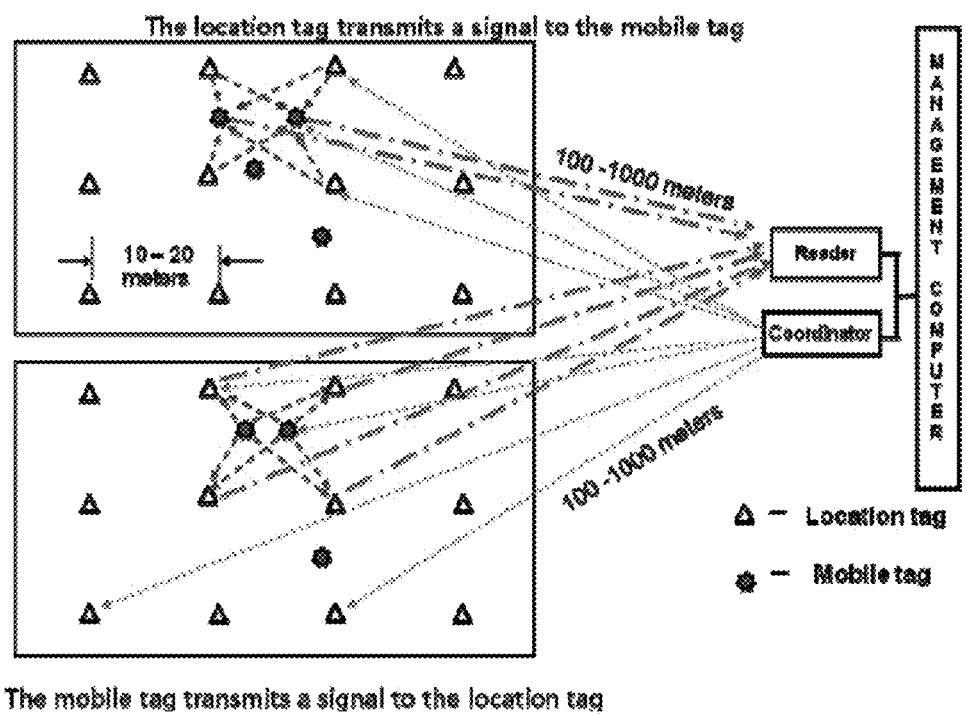
FIG. 1 illustrates working of a location system.
Figure 2:
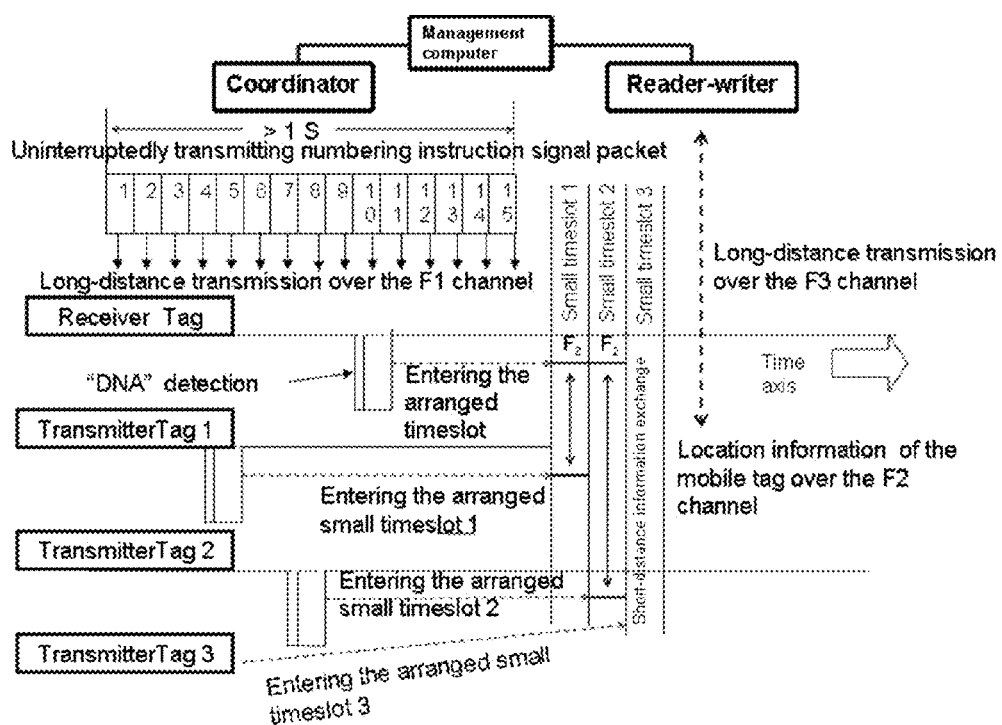
FIG. 2 illustrates information exchange in the location system.
Figure 5:
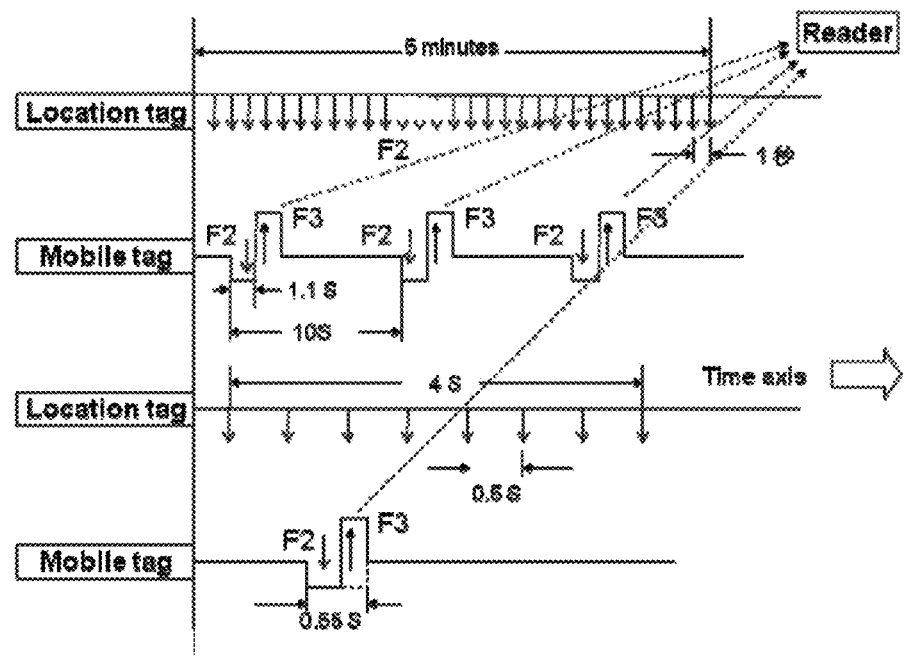
FIG. 5 illustrates communication between a mobile tag and a location tag without coordinator clock information.

When the location tag and the mobile tag receive the instruction for locating the mobile tag from the coordinator, the location tag and the mobile tag may use the following communication manner to communicate with each other: the transmitter tag periodically transmits a signal outside within a period of time by the transmitter tag, and the receiver tag continuously monitors the transmitted signal within a short period of time (long than a transmission period of the signal transmitted by the transmitter tag), as illustrated in FIG. 5; or the location tag and the mobile tag communicate based on a specific timeslot allocated by the coordinator and in a specific time sequence, as illustrated in FIG. 2.

It should be noted that, when the signals are transmitted with powers from low to high in sequence, irrespective of whether the location tag transmits the signal and the mobile tag receives the signal or the mobile tag transmits the signal and the location tag receives the signal, the signal first received by the receiver tag is definitely the signal transmitted when the mobile tag and the location tag are located at a nearest distance. With the increasing of the transmit power, a signal transmitted when the mobile tag and the location tag are located at a longer distance is received. Therefore, the receiver tag first receives information transmitted by the transmitter tag at the lowest power level and considers the information as the unique information for determining the location of the mobile tag, whereas subsequent information transmitted by the transmitter tag at a higher transmit power level, is ignored by the receiver tag. At this time, the receiver tag does not receive the signal transmitted from the transmitter tag either, and transmits a receipt to instruct the transmitter tag to stop transmitting the signal if necessary. Upon receiving the receipt, the transmitter tag returns back to the F1 channel, enters a low-power-consumption state where the transmitter tag intermittently monitors, after periodically waking up, the working instruction signal from the coordinator for an instant sufficient to capture bits for performing DNA check.

Meanwhile, the receiver tag also transmits, according to a manner required by the system, its own ID and location information of the mobile tag to a reader over the F3 channel then, to the management computer; and returns to the F1 channel after receiving a receipt indicating that the reader successfully receives the information, enters a low-power-consumption state where the receiver tag intermittently monitors, after periodically waking up, the working instruction signal from the coordinator for an instant sufficient to capture bits for performing DNA check, as illustrated in FIG. 4.

Determination of the Location of the Mobile Tag

For the transmitter tag, the mobile tag, and the location tag, besides the foregoing Cell-ID locating manner as illustrated in FIG. 3, the location of the mobile tag is determined as follows: calculating a physical relationship and a geometrical relationship among two (in the one-dimensional space), three (in the two-dimensional space), or four (in the three-dimensional space) location tags with a most robust RSSI signal to obtain a location, which is regarded as the location of the mobile tag; or using other locating methods with the radio frequency signal information obtained by exchange between the location tag and the mobile tag to obtain a location, which is regarded as the location of the mobile tag.

Among all the foregoing methods for determining the location of the mobile tag, the location tag needs to have an RSSI indication function when the RSSI is involved.

Two Application Scenarios and Two Working Instructions of the Coordinator

The system only requires that a battery used by the location tag has a long service life while has a relative low requirement for the service life of the battery used by the mobile tag, for example, the mobile tag may use a rechargeable battery, which is charged once every 10 days or half a month. Locating a visitor in an exhibition hall At this time, a working instruction transmitted by the coordinator to all tags does not need to carry clock information. When a mobile tag needs to be located, the coordinator continues to uninterruptedly broadcast the working instruction to all the tags in a locating area within a time period longer than 1 s, informing the tags of an employed working manner. For example, all location tags are required to continuously use a −30 dBm transmit power within 4 s after receiving the instruction from the coordinator, to transmit 8 signals, over the F2 channel, at an interval of 0.5 s, or continue to uninterruptedly transmit a signal once every is within a 5-minute working period; accordingly, the mobile tag is required to wait for a wakeup period (1 s) of a location tag after receiving the signal from the coordinator, and monitor the signal received from the location tag over the F2 channel within a period of time longer than 0.5 s, or wakes up once every a certain period of time within a 5-minute working period, and monitors the signal received from the location tag within a period of time longer than 1 s after waking up. After monitoring time ends, the monitor tag transmits the received information to a reader over the F3 channel according to a manner required by the system. Under this circumstance, the instruction signal transmitted by the coordinator does not need to carry the clock information, and the tags use a respective internal clock, as illustrated in FIG. 4.

B. The system has a higher requirement for the service life of the batteries of the location tag and the mobile tag. For example, in an application scenario where a luggage or a person is traced or located at an airport, the mobile tag cannot be recharged at any time because the mobile tag is fixed on the luggage. That is, the battery of the mobile tag is required to have a long service life. Moreover, at the airport, the mobile tag is not allowed to uninterruptedly transmit an electromagnetic wave signal outside. Therefore, when locating the luggage and the person, for a purpose of reducing a working duty ratio of the mobile tag, a coordinator uninterruptedly transmits a working instruction signal to a related tag within a 1.1-second period of time in a related locating area.

Different from the foregoing working instruction transmitted by the coordinator, each instruction signal herein carries clock information. By receiving an instruction signal packet from the coordinator at a wakeup instant, the related tag acquires the clock information. In this manner, the coordinator may arrange the mutual exchange of information between the location tag and the mobile tag within a timeslot as short as possible to decrease the working duty ratio of the mobile tag. The instruction of the coordinator may further comprise a specific location of a communication timeslot, in a time axis, within which two types of tags communicate with each other, and information about a sequence following which a plurality of transmitter tags enter different small timeslots in the same communication timeslot. Assume that the wakeup period of two types of tags is 1 s, considering that the tags may be waked up at any time within a 1-second period, the communication timeslot of the location tag and mobile tag is set to 1 s after the coordinator starts to continuously transmit the wakeup instruction signal.

Besides carrying absolute clock information in each instruction signal packet transmitted by the coordinator, a manner for delivering clock information from the coordinator to the tag may further be as follows: each instruction signal packet is numbered in sequence to deliver relative clock information. When the coordinator uninterruptedly transmits the same instruction signal, time required for transmitting each instruction signal packet is the same, for example, 1 ms. Therefore, when receiving an instruction signal packet with a serial number at the wakeup instant, the tag learns a relative time location where it is located at the time of receiving the instruction signal packet, that is, relative to the instant when the coordinator starts to transmit the first instruction signal packet, as illustrated in FIG. 2.

Signal Collision During Communication Between the Location Tag and the Mobile Tag During arrangement of a timeslot for information exchange between the location tag and the location tag, a specific location and length of the timeslot on the time axis of the communication timeslot needs to be defined. However, since a receiver tag may receive information from a plurality of adjacent transmitter tags within the same timeslot, the problem of signal collision needs to be considered.

Method for Implementing Anti-Signal Collision During Communication Between the Location Tag and the Mobile Tag In one aspect, to save power, the timeslot for communication between the location tag and the mobile tag is defined as shorter as possible. This may reduce power consumption of the tags. In another aspect, to lower the probability of signal collision, the timeslot for communication between the location tag and the mobile tag is desired to be longer. It should be emphasized herein that since the Cell-ID-based location is employed, the locating system controls the communication distance between the mobile tag and the location tag. Therefore, the receiver tag may only receive signals from a very limited number of adjacent transmitter tags. When the location tag transmits a signal to the mobile tag, the mobile tag, within a limited time period, may only receive signals from less than four tags in different locations. Therefore, such case shall also be considered in an anti-signal collision measure employed during communication between the tags.

After the transmitter tag receives an instruction from the coordinator and is arranged to transmit an ID signal within a longer communication timeslot, to prevent signal collision, N small timeslots may be defined at the start portion of the entire communication timeslot, for example, four to eight small timeslots. Considering the time error, each small timeslot may receive the signal transmitted by one transmitter tag. The larger the number of small timeslots that are arranged is, and the smaller the probability of signal collision of the transmitter tag is. In this way, the time for the receiver tag to receive the signal is longer and more power is consumed. On the contrary, the smaller the number small timeslots that are arranged is, the larger the probability of signal collision of the location tag is. In this way, the time for the receiver tag to receive the signal is shorter and less power is consumed.

In this case, the transmitter tags enter different small timeslots (timeslot Alaho) by staggering the time for transmitting IDs using the method of random delay. The method of random delay may be randomly selecting a number among 1 to N by the tag, and then multiplying the selected number by a small timeslot (N is the number of small timeslots), or may be entering the allocated small timeslots by using numbers in the least significant bits of the IDs of the transmitter tags.

For example, when the location tag arranges different small timeslots for signal transmission according to differences of the two least significant bits of the ID thereof, signals are transmitted with delays (for example, 2.5 ms) obtained by multiplying 00, 01, 10, 11 (equivalent to decimal numbers 0,1,2,3) by a small timeslot respectively. In this case, the delays of different location tags in the four bits are respectively 0, 2.5 ms, 5 ms, and 7.5 ms. Herein the length of a small timeslot comprises the time required for transmitting a complete signal by each location tag plus various corresponding time errors.

Figure 6:
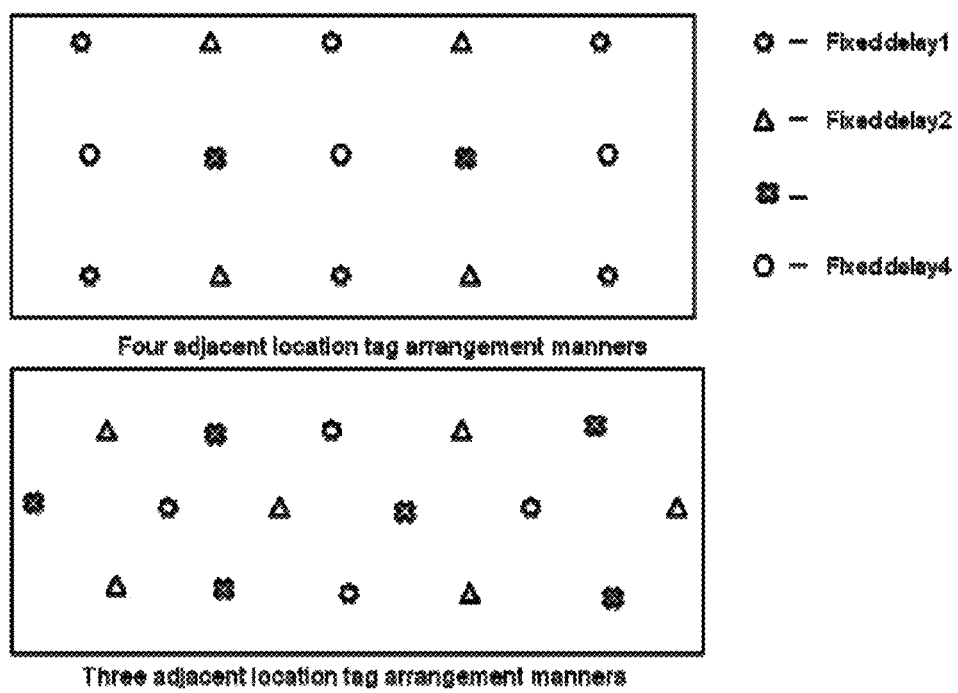
FIG. 6 illustrates installation and deployment of a location tag.

In addition, four different fixed delays may be preset for all the location tags. To be specific, when the location tags are arranged to enter communication tags between the location tag and the mobile tag, they automatically use the preset delays to transmit ID signals thereof. The preset delays may be, for example, 0, 2.5 ms, 5 ms, and 7.5 ms. Four different colors are used to denote the location tags having different fixed delays. During deployment of the location tags, the tags having the same delay need to be staggered, as illustrated in FIG. 6. Upon receiving an instruction from the coordinator, the location tags in different colors around the mobile tag automatically enter one of the pre-assigned four small timeslots according to the preset fixed delays, to implement communication with the mobile tag.

If the locating system specifically requests the transmitter tags to transmit signals using more transmit power levels, the coordinator needs to arrange a longer communication timeslot and more small timeslots to receive the signals transmitted by the transmitter tags. The length of the entire communication timeslot shall be a sum of small timeslots that need to be pre-assigned. And is an upper time threshold for the receiver tags to wait to receive the signals from the transmitter tags. For example, during the communication timeslot, once the mobile tag is capable of receiving any signal accommodating a locating requirement, the mobile tag immediately stops receiving a signal from the location tag, and enters another working state. Therefore, the mobile actually spends only one or several small timeslots, or even tens of or more small timeslots in monitoring the signal received from the location tag (when signals are transmitted by the location tag using a plurality of transmit power in an ascending order to improve the locating precision).

In the locating manner where the location tag broadcasts a signal to the adjacent mobile tags, the mobile tag clearly knows the number of adjacent location tags from which the mobile tag receives the signal. On the contrary, when the mobile tag transmits a signal to the location tags, except the management computer, each location tag does not known the number of location tags having received the signal from the same mobile tag. In addition, different from distribution of the location tags having fixed spacing, the distribution density of the mobile tags is randomly changing, which may be smaller than or larger than the distribution density of the location tags. Therefore, the system needs to adjust the size of the communication timeslots and the number of small timeslots according to the distribution density of the mobile tags in the locating area, such that signals transmitted by more mobile tags to the adjacent location tags are received.

In addition to preventing signal collision by arranging more small timeslots in a larger communication timeslot, the location tag may be employed to monitor RSSI before transmitting a signal, and once detecting that a transmission channel is occupied, randomly delays in monitoring, and transmits the signal upon determining that the transmission channel is not occupied.

Anti-Signal Collision in a Case Where a Plurality of Receiver Tags Transmit Signals to the Reader After generating the information comprising the information for determining the location of the mobile tags by the information exchange between the location tag and the mobile tag, the locating system needs to transmit the information to the reader and the management computer over the F3 channel by using the receiver tags receiving the information. Since generally a large number of receiver tags transmit information to the reader, an anti-signal collision measure is needed.

In addition to the above-described anti-signal collision methods including timeslot Alabo, and the CSMA, since the number of location tags and their IDs thereof in a governing range of one reader are fixed. Therefore, when the solution where the mobile tag transmits an ID signal to the location tag is employed to implement locating, the location tags may periodically enter different small timeslots respectively and packetize the received information and transmit the packetized information to the reader, by using the clock information obtained when the location tag receives a working instruction signal from the coordinator, according to the IDs of all known location tags in the locating area and according to pre-arrangements and an update period of the location of the mobile tag required by the system.

In most cases, the number of possible mobile tags in the governing range of a reader is limited, for example, not more than 1000, and the IDs thereof are known. Therefore, the solution where the location tag transmits information to the mobile tag is employed to implement locating, each mobile tag may periodically enter the different pre-assigned small timeslots respectively and transmit information to the reader, by using the clock information obtained when the location tag receives a working instruction signal from the coordinator, according to the IDs of all known mobile tags that may appear in the locating area, and according to an update period of the location of the mobile tag required by the system.

In addition, in most cases, the number of mobile tags entering or exiting the governing range of a locating reader is limited, and the mobile tags in the locating area change limitedly. The IDs of the mobile tags in the locating area may be periodically collected, and the mobile tags may be assigned, according to the above method and the collected IDs, small timeslots within which the mobile tags transmit information to the reader. Subsequently, information of the mobile tags with unknown IDs, which enter the locating area, may be collected in another manner, for example, the manner of firstly monitoring the RSSI and then transmitting signals.

It should be noted herein that during communication between the mobile tag and the location tag, and the mobile tag and the location tag, and the reader, if a larger number of tags transmit signals to the same receiver tag or reader, the receiver tag or reader fails in processing due to large volume of the information. The transmitter tags may also be grouped according to the IDs thereof, and signals pertaining to different groups are processed in a time division manner; or in a frequency division manner, the number of readers in the same locating area is increased, and the transmitter tags in different groups are distributed over more channels to process information; or one or a plurality of groups of location tags working over different channels are added to share information processing workload of the mobile tags in the locating area.

Embodiment 1: Personnel Locating in an Exhibition

Requirements: In a 50×100 exhibition hall, 200 visitors need to be real-time located. A locating precision of 5 meters is desired. The battery life of the location tag is more than 5 years. When the mobile tag employs the working mode A, the battery life thereof is generally more than 10 days (rechargeable); when the working mode B and a card-like mobile RFID tag with a small-capacity battery are employed, the battery life is more than 2 years.

Implementation:

A location tag is deployed at a spacing of 10 meters in the entire exhibition hall, and the deployment of location tags may be referenced to FIG. 2. Totally 50 location tags need to be deployed in the entire exhibition hall. Each two adjacent location tags have different fixed delays when entering a communication timeslots assigned by the coordinator, as illustrated in FIG. 6.

A coordinator and a reader are deployed at the center roof top of the exhibition hall, and the coordinator and the reader are connected to a management computer in a wired or wireless manner. If a higher speed is required for update of the location information of the mobile tags, the frequency division working manner may be employed, and one or more readers may be added. The coordinator and the reader are connected to the management computer in a wired or wireless manner. The coordinator works over the F1 channel and the reader works over the F3 channel.

Each of the visitor wears a card-like mobile RFID tag (working in mode A) powered by a rechargeable Lithium battery, or a card-like mobile RFID tag (working in mode B) powered by a primary Lithium battery. A long-distance active RFID tag (with a visible distance of longer than 300 meters) may serve as the mobile RFID tag, thereby ensuring communication between all tags and the coordinator and the reader in cases of blocking The location tag and the mobile tag are both set in a periodical sleep mode, wake up every one second, and in such a way intermittently monitor a working instruction signal for an instant sufficient to capture bits for performing DNA check the coordinator transmits a working instruction signal. To be specific, the location tag and the mobile tag work in a low-power-consumption mode.

Communications between the location tag and the mobile tag, and the location tag and the mobile tag, and the coordinator and the reader reach a communication rate of 200 kbit/s and 125 kbit/s. The coordinator transmits a signal packet to the tags, and lengths of location signal packets transmitted by the location tag to the mobile tag and transmitted by the mobile tag to the reader are both 22 bytes. Durations elapsed for transmitting one signal packet at the above communication rates are respectively 0.7 ms and 1.41 ms.

Working Mode A:

Step 1: Upon opening of the exhibition each day, the management computer uninterruptedly broadcasts a 1.1-second working instruction at a specific interval (for example, at an interval of five minutes) to all the tags in the hall by using the coordinator, to instruct each location tag to transmit, within the five minutes, a location signal at an interval of one second over the F2 channel using predetermined transmit power (the corresponding signal coverage radius of the mobile tag is about 7.5 meters), and return to the low-power-consumption mode where the location tag intermittently monitors, over the F1 channel, a working instruction signal for an instant sufficient to capture bits for performing DNA check, and extends the instant to receive the entire signal, thereby acquiring a complete working instruction signal packet. In this way, an opportunity that the locating system transmits different working instructions to the tag is reserved. During the entire locating process, to maintain the communication distance between the mobile tag and the location tag within about 7.5 meters, two monitoring tags whose distances from a location tag are known, for example, 6.5 meters and 8.5 meters, may be preset in the locating area. The monitoring tag is configured to monitor an impact caused by changes of environment, noise, and platform onto the communication distance between the location tag and the mobile tag, such that the transmit power of the location tag may be adjusted timely as required. A wearable card-like mobile tag is provided for each exhibition representative, and a database of the management computer stores related information of each wearer of the mobile tag. After entering the exhibition, the mobile tag analogously receives the working instruction signal broadcast by the coordinator, where the instruction signal instructs the mobile tag to continue to monitor, within the five minutes, the signal from the location tag for 1.1 second at an interval of 10 seconds over the F2 channel, as illustrated in FIG. 5.

Step 2: After constantly monitoring the signal from the location tag for one second, the mobile tag returns to the F3 channel, and transmits the ID of a location tag with the strongest signal. Since a plurality of mobile tag transmit signals to the reader at an interval of 10 seconds in the exhibition hall, thereby resulting in signal collision. In this case, a corresponding anti-signal collision measure is needed. Herein signal collision is prevented using the solution where the mobile terminal firstly monitors the RSSI over the F3 channel. If the F3 channel is occupied, the mobile terminal monitors the RSSI after a random delay, and transmits the ID of the selected location tag and the ID thereof to the reader only when detecting that the F3 channel is not occupied. After transmission, the mobile tag enters the sleep state, and returns to the F2 channel 10 minutes later to continue to monitor the signal from the location tag for one second. Five minutes later, the mobile tag returns to the low-power-consumption state where the mobile tag periodically monitors the instruction from the coordinator over the F1 channel.

Working Mode B

Step 1: Upon opening of the exhibition each day, when the mobile tags need to be located (for example, locating is performed at an interval of 10 seconds), the management computer uninterruptedly broadcasts 1.1-second working instruction to all the tags by using the coordinator. Different from the working mode A, herein each of the uninterruptedly transmitted working instruction signal packets comprises a sequence number. Each location tag and mobile tag, at an instant of waking up and receiving the instruction signal packet, obtains relative clock information when they randomly wake up. Upon receiving the instruction from the coordinator, the location tags respectively enter, according to fixed delays thereof over the F2 channel, four small timeslots assigned by the coordinator for communication with the mobile tags. In this case, the timeslots are between 1000 and 1020 ms after the coordinator transmits the first instruction signal packet. The four location tags having the fixed delays are respectively arranged in the small timeslots of 1010-1012.5 ms, 1012.5-1015 ms, 1015-1017.5 ms, and 1017.5-1020 ms to transmit information. The mobile tags are arranged between 100-1020 ms to wait to receive, over the F2 channel, the information from the location tags, as illustrated in FIG. 2

Step 2: After constantly monitoring the signal from the location tag for 10 ms, the mobile tag immediately skips to the F3 channel, and transmits the received ID of the location tag with the largest RSSI value and the ID thereof to the reader according to the working manner of anti-signal collision described in the working mode A, and after successfully transmitting the information, returns to a low-power-consumption state where the mobile tag enters the periodical sleep mode over the F1 channel, and intermittently monitors, after periodically waking up, a working instruction signal for an instant sufficient to capture bits for performing DNA check.

If the locating precision needs to be further improved, a plurality of location tags may be used to locate a mobile tag, and the transmit power of the location tag needs to be increased such that the number of location tags from which each mobile tag receives a signal each time is larger than three. Then information of three location tags with the maximum RSSI value is selected as the information for calculating the location of the mobile tag.

Step 3: The same as the working mode A.

Detailed above is further description of the present invention with reference to some preferred embodiments, and is not intended to limit the scope of the present invention in terms of implementation. Persons of ordinary skill in the art shall understand that other simple deductions and replacements may be made without departing from the inventive concept of the present invention. Such deductions and replacements shall be deemed as within the scope of the present invention.

What is claimed is:

1. A simple and precise radio frequency locating system, comprising: a location tag, a mobile tag, a coordinator, a reader, and a management computer; wherein:

the location tag is arranged in different fixed positions in a locating area, and is configured to receive, over an F1 channel, a working instruction signal from said coordinator, and exchange information with said mobile tag over an F2 channel in a manner indicated in the working instruction signal to generate information comprising information for determining a location of the mobile tag;

the mobile tag is arranged on a moving target to be positioned or carried by the moving target, and is configured to receive, over the F1 channel, the working instruction signal from the coordinator, and exchanges the information with the location tag over the F2 channel to generate the information comprising the information for determining the location of the mobile tag;

the coordinator is connected to said management computer in a wired or wireless manner or working independently according to a predetermined program, and is configured to capture an instant when the location tag and the mobile tag receive the working instruction signal by uninterruptedly transmitting the working instruction signal to the location tag and the mobile tag over the F1 channel within a period of time, establish communication with the location tag and the mobile tag and deliver a working instruction to the location tag and the mobile tag, arrange a time and a manner to the location tag and the mobile tag to exchange the information, and a time and a manner for the location tag and the mobile tag to exchange the information with said reader;

the reader is configured to wirelessly communicate with the mobile tag or the location tag over an F3 channel, collect the information comprising the information for determining the location of the mobile tag, and transfer the collected information to the management computer in a wired or wireless manner; and the management computer is configured to: manage and control the entire locating system, comprising: delivering the working instruction to the location tag and the mobile tag by the coordinator over the F1 channel, or prewriting the predetermined program for delivering the working instruction to the location tag and the mobile tag into the coordinator, receiving the information comprising the information for determining the location of the mobile tag by the reader over the F3 channel, and determining the location of the mobile tag in a predetermined manner and providing the determined location to an application program, wherein the management computer stores location information corresponding to each location tag ID;

wherein both the location tag and the mobile tag are active radio frequency identification tags that are battery-powered and are set as periodical sleeping, and intermittently monitor the working instruction signal from the coordinator over the F1 channel for an instant sufficient to capture bits for performing DNA check, both the location tag and the mobile tag have a unique ID, and the location tag further carries information of location coordinates thereof; and a communication distance between the location tag and the mobile tag depends on a requirement on locating precision of the system on the moving target;

wherein the period of time within which the coordinator uninterruptedly transmits the working instruction signal to the location tag and the mobile tag over the F1 channel is not shorter than a sleep period of the location tag and the mobile tag.

2. The system according to claim 1, wherein the location tag and the mobile tag, intermittently monitor the working instruction signal from the coordinator over the F1 channel for an instant sufficient to capture bits to see whether a signal compliant with the DNA check of the coordinator is detected, and the location tag and the mobile tag extend the instant to receive a complete working instruction signal packet from the coordinator after having received a signal complaint with the DNA check.

3. The system according to claim 1, wherein a manner for the location tag and the mobile tag to exchange the information over the F2 channel is that one of the two types of tags is a transmitter tag, and the other is a receiver tag, the transmitter tag transmits a signal including its own ID to the receiver tag, the receiver tag transmits its ID and the received information to the reader over the F3 channel in a manner required by the system upon receiving the signal from the transmitter tag; and when a plurality of receiver tags transmit information to the reader, communication between the receiver tags and the reader requires anti-signal collision.

4. The system according to claim 3, wherein:

in the working instruction transmitted by the coordinator to the mobile tag and the location tag, time arrangement for transmitting information by a transmitter tag to the receiver tag comprises:

periodically transmitting a signal outside within a period of time by the transmitter tag, and waiting to receive the signal by the receiver tag from the transmitter tag within one or a plurality of time periods, within the period of time, not shorter than a transmission period of the transmitter tag; or transmitting a signal by the transmitter tag to the receiver tag based on a specific timeslot allocated by the coordinator and a time sequence, and receiving the signal by the receiver tag from the transmitter tag within the specific timeslot; and in the working instruction transmitted by the coordinator to the mobile tag and the location tag, the transmitting a signal by the transmitter tag to the receiver tag comprises:

when the transmitter tag is the location tag, transmitting the signal by all location tags using same or different single fixed power determined by a system location precision requirement or transmitting the signal using a plurality of power according to an ascending order of transmit power, or when the transmitter tag is the mobile tag, transmitting the signal by all mobile tags using single fixed power determined by a system location precision requirement or transmitting the signal using a plurality of power according to an ascending order of transmit power.

5. The system according to claim 4, wherein during determining the specific location of a mobile tag, under the prerequisite a maximum communication distances between related location tags and mobile tags are the same, the location of the mobile tag is determined as follows:

if only one location tag is capable of communicating with a mobile tag, the location of the location tag is the location of the mobile tag;

if two or three location tags are capable of communicating with a mobile tag, the geometric center of the two or three location tags is the location of the mobile tag;

if more than three location tags are capable of communicating with a mobile tag, the geometric center of a location tag with a most robust RSSI signal is the location of the mobile tag, or the location of the mobile tag is a location that is calculated according to location coordinates of the three location tags, corresponding RSSI values thereof, and physical and geometric relationships between the information; or the location of the mobile tag is a location that is calculated using another radio frequency signal locating method according to other information obtained by exchange between the location tag and the mobile tag;

wherein in one-dimensional or three-dimensional space, the number of location tags involved in the method is adaptively adjusted.

6. The system according to claim 5, wherein when Cell-ID-based location is employed, a maximum communication distance between the location tag and the mobile tag is controlled according to ¾ of a spacing of the location tags.

7. The system according to claim 4, wherein when the coordinator requests the location tag and the mobile tag to exchange the information within the specific timeslot by uninterruptedly transmitting the working instruction signal packet to the location tag and the mobile tag, especially when a plurality of transmitter tags enter small timeslots allocated thereto to transmit signals to the receiver tags based on a predetermined time sequence, each of the working instruction signal packets is capable of transferring clock information to the mobile tag and the location tag, comprising: transferring the clock information to the mobile tag and the location tag by numbering, based on a time sequence, each of the transmitted working instruction signal packets, wherein each mobile tag and each location tag work in a small timeslot assigned thereto according to the clock information.

8. The system according to claim 7, wherein when the transmitter tag is the location tag and the receiver tag is the mobile tag, the mobile tag, after obtaining real-time location information or location-related information thereof by receiving the information transmitted by the location tag, transfers the information through the reader to the management computer in the following ways:

A. the mobile tag immediately transmits the information over the F3 channel to the reader;

B. the mobile tag firstly records the real-time location information, or real-time location information obtained by simply calculating the location-related information in a memory thereof, and transfers recorded path information through the reader to the management computer only after receiving from the management computer an instruction for reading the path information.

9. The system according to claim 8, wherein when the transmitter tags transmit the signals to the receiver tags, in addition to controlling transmit power and transmission manner of the transmitter tags such that the receiver tags are only capable of receiving signals from a limited number of adjacent transmitter tags, the limited number of transmitter tags transmit the signals within different small timeslots in a communication timeslot, comprising: employing a timeslot Aloha manner; using differences between least significant bits of a location ID to allocate the small timeslots; and when the transmitter tag is the location tag, pre-setting different fixed transmission delays corresponding to lengths and locations of the allocated small timeslots, and deploying the location tags having the same fixed transmission delay in a staggered manner during deployment of the location tags.

10. The system according to claim 8, wherein when the receiver tags transmit information to the reader, the small timeslots for transmitting signals are allocated to the receiver tags according to the known ID of each of the receiver tags by using the clock information transferred over the working instruction signal packet from the coordinator.

11. The system according to claim 1, wherein the F1, F2, and F3 channels are different from each other, and the F1 channel and F2 channel are the same only when the coordinator communicates with the location tag and the mobile tag and the mobile tag communicates with the location tag in a time staggered manner; and analogously, the F2 channel and F3 channel are the same when the location tag communicates with the mobile tag and the mobile tag or the location tag communicates with the reader in a time staggered manner.

12. A simple and precise radio frequency locating method, comprising: a coordinator, a reader, a management computer, a mobile tag, and a location tag having a fixed location;

wherein the coordinator captures an instant when the location tag and the mobile tag monitor a working instruction signal after waking up by uninterruptedly transmitting, over an F1 channel within a period of time, the working instruction signal to the location tag and the mobile tag that intermittently monitor, over the F1 channel, the working instruction signal for an instant sufficient to capture bits for performing DNA check, establishes communication with the location tag and the mobile tag and delivers a working instruction to the location tag and the mobile tag by using the established communication, and arranges a communication time and a communication manner between the mobile tag and the location tag, and the mobile tag and the location tag, and the reader;

wherein information exchange between the mobile tag and the location tag comprises: information exchange for locating of the mobile tag; wherein location information of the mobile tag is generated by information exchange between the location tag having the fixed location and the mobile tag, and is transmitted to the reader connected to the management computer by directly using the mobile tag or the location tag in a wireless manner;

wherein during arrangement of communication between the location tag and the mobile tag, the number of location tags that may communicate with the same mobile tag is controlled within a desired range by controlling power for transmitter tags of the location tag and the mobile tag to transmit the signals;

wherein during communication between the mobile tag and the location tag, and the mobile tag and the location tag, and the reader, when a plurality of tags simultaneously transmit signals to a same receiver tag of the location tag and the mobile tag or reader, anti-signal collision is employed, comprising: employing a timeslot Aloha manner; using differences between least significant bits of a location ID to allocate small timeslots;

wherein during transmitting information by the location tag or the mobile tag to the reader, the small timeslots for transmitting signals are allocated to the receiver tags according to the known ID of each location tag or mobile tag in a locating area by using the clock information transferred over the working instruction signal packet from the coordinator.

13. The method according to claim 12, wherein when the arranging by the coordinator the time for communication between the location tag and the mobile tag by carrying clock information in each uninterruptedly transmitted working instruction signal packet comprises: transferring the clock information to the location tag and the mobile tag by numbering each transmitted working instruction signal based on a time sequence; communicating by the location tag and the mobile tag within an assigned timeslot according to the clock information; wherein particularly, when the plurality of transmitter tags transmit information to the same receiver tag or reader, the transmitter tags transmit, by using the clock information and based on a predetermined time sequence, the information within different small timeslots in the assigned timeslot to address signal collision.

14. The method according to claim 12, wherein with respect to signal collision during sending signals by a plurality of adjacent location tags to the mobile tag, different fixed transmission delays are set for the plurality of adjacent location tags to prevent signal collision.

15. The method according to claim 12, wherein during communication between the mobile tag and the location tag, and the mobile tag and the location tag, and the reader, if a larger number of tags transmit signals to the same receiver tag or reader, the receiver tag or reader fails in processing due to large volume of the information; in this case, the transmitter tags are grouped according to the IDs thereof, and spacing of the location tags is reduced using time division or frequency division, or a governing range of each reader is narrowed, or a combination of such measures is employed, to reduce signal processing volume for each receiver tag or reader within a unit time.

16. The method according to claim 12, wherein in addition to the reader that collects location information of the mobile tag in a wireless manner and is connected to the management computer in a specific locating area, no any other reader is required to generate the location information of the mobile tag; precision of locating the mobile tag is improved by increasing the number of location tags, shortening spacing between deployed location tags, controlling a maximum communication distance between the location tag and the mobile tag, improving a calculation method of the location precision using the collected related information for determining the location of the mobile tag.

* * * * *